United States Patent
Li et al.

(10) Patent No.: US 10,957,285 B2
(45) Date of Patent: Mar. 23, 2021

(54) METHOD AND SYSTEM FOR PLAYING MULTIMEDIA DATA

(71) Applicant: BANMA ZHIXING NETWORK (HONGKONG) CO., LIMITED, Kowloon (HK)

(72) Inventors: Jiangwei Li, Hangzhou (CN); Xueshu Zhong, Beijing (CN); Yongqin Liu, Beijing (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 0 days.

(21) Appl. No.: 16/044,088

(22) Filed: Jul. 24, 2018

(65) Prior Publication Data

US 2019/0012987 A1 Jan. 10, 2019

Related U.S. Application Data

(63) Continuation-in-part of application No. PCT/CN2017/071716, filed on Jan. 19, 2017.

(30) Foreign Application Priority Data

Feb. 1, 2016 (CN) .......................... 201610070464.9

(51) Int. Cl.
| | |
|---|---|
| *G09G 5/377* | (2006.01) |
| *G09G 5/14* | (2006.01) |
| *G06F 9/451* | (2018.01) |
| *G06T 1/20* | (2006.01) |
| *G06F 3/0485* | (2013.01) |

(52) U.S. Cl.
CPC ............. *G09G 5/377* (2013.01); *G06F 9/451* (2018.02); *G06T 1/20* (2013.01); *G09G 5/14* (2013.01); *G06F 3/0485* (2013.01); *G06F 2203/04804* (2013.01); *G09G 2340/125* (2013.01); *G09G 2354/00* (2013.01)

(58) Field of Classification Search
CPC ............. G09G 5/377; G09G 2340/125; G09G 2354/00; G06F 9/451; G06F 3/0485; G06T 1/20
See application file for complete search history.

(56) References Cited

U.S. PATENT DOCUMENTS

| | | | |
|---|---|---|---|
| 8,065,614 B2 | 11/2011 | Ma | |
| 8,078,981 B2 * | 12/2011 | MacInnis | G06T 9/00 345/629 |
| 2003/0170006 A1 | 9/2003 | Bogda | |

(Continued)

FOREIGN PATENT DOCUMENTS

| | | |
|---|---|---|
| CN | 102665130 | 9/2012 |
| CN | 102739983 | 10/2012 |

(Continued)

*Primary Examiner* — Antonio A Caschera
(74) *Attorney, Agent, or Firm* — Van Pelt, Yi & James LLP

(57) ABSTRACT

Playing multimedia data including instructing that a transparent area be painted in a first drawing layer, instructing that a multimedia data playing window be painted in a second drawing layer, the multimedia data playing window overlapping with the transparent area, instructing synchronous display of the transparent area and the playing window, and instructing that the multimedia data be played in the playing window.

11 Claims, 10 Drawing Sheets

(56) References Cited

U.S. PATENT DOCUMENTS

| | | |
|---|---|---|
| 2004/0201608 A1 | 10/2004 | Ma |
| 2007/0229542 A1 | 10/2007 | Van Ieperen |
| 2011/0022942 A1 | 1/2011 | Flemings |
| 2015/0019413 A1* | 1/2015 | Lazarus ................ G06F 17/243 |
| | | 705/39 |
| 2015/0310833 A1 | 10/2015 | Zhao |

FOREIGN PATENT DOCUMENTS

| | | |
|---|---|---|
| CN | 104615418 | 5/2015 |
| CN | 104685460 | 6/2015 |
| CN | 104954848 | 9/2015 |

* cited by examiner

100

300

500

600

METHOD AND SYSTEM FOR PLAYING MULTIMEDIA DATA

CROSS REFERENCE TO OTHER APPLICATIONS

This application is a continuation-in-part of and claims priority to International (PCT) Application No. PCT/CN17/71716 entitled MULTIMEDIA DATA PLAYING METHOD, APPARATUS AND DEVICE, AND INTERFACE RENDERING METHOD, APPARATUS AND DEVICE, filed on Jan. 19, 2017 which is incorporated herein by reference in its entirety for all purposes, which claims priority to China Patent Application No. 201610070464.9 entitled A METHOD OF PLAYING MULTIMEDIA DATA, AN INTERFACE RENDERING METHOD AND MEANS, AND A DEVICE, filed on Feb. 1, 2016 which is incorporated by reference in its entirety for all purposes.

FIELD OF THE INVENTION

The present application relates to a method and a system for playing multimedia data.

BACKGROUND OF THE INVENTION

When playing multimedia data on an application (app) interface, in certain contexts, the assistance of a multimedia data playing service to play the multimedia data is required. An area on the application interface that serves as a display area for multimedia data exists. A scheme for implementing the display area for the multimedia data in the application interface utilizes drawing a transparent area in a drawing layer of the drawing interface when the corresponding application interface is rendered. A playing window is separately drawn in another drawing layer, and the playing window overlaps the transparent area. The playing window displays each frame of the multimedia data that is to be played.

In the event that the user performs an operation such as scrolling or going to the next or previous page, the position of the transparent area changes, and the position of the playing window is to be adjusted accordingly. The adjusting of the transparent area and the playing window tends to cause the appearance of white edges or data jitter. White edges or data jitter—occur when the position of the transparent area and the position of the playing window changes are out of sync.

SUMMARY OF THE INVENTION

A process and device for playing multimedia data and an interface rendering thread are disclosed.

The process for playing multimedia data is provided and comprises:
instructing that a transparent area be painted in a first drawing layer;
instructing that a multimedia data playing window be painted in a second drawing layer, the multimedia data playing window overlapping with the transparent area;
instructing a synchronous display of the transparent area and the multimedia data playing window;
instructing that the multimedia data be played in the multimedia data playing window.

An interface rendering thread is provided and comprises:
issuing first information and second information to a graphics processing unit (GPU) process, the first information instructing that a transparent area be painted and the second information instructing that a multimedia data playing window be painted;
painting the transparent area in a drawing layer based on the first information upon receiving results from the GPU process.

A device for playing multimedia data is provided and comprises:
a drawing control module configured to instruct that a transparent area be painted in a first drawing layer; instruct that a multimedia data playing window be painted in a second drawing layer, the multimedia data playing window overlapping with the transparent area;
a display control module configured to instruct synchronous display of the transparent area and the playing window, and instruct that the multimedia data be played in the playing window.

An interface rendering device is provided and comprises:
an instructing module configured to issue first information and second information to a graphics processing unit (GPU) process; the first information instructing that a transparent area be painted and the second information instructing that a multimedia data playing window be painted;
a drawing module configured to paint the transparent area in a drawing layer based on the first information upon receiving an advice from the GPU process.

The present application exercises synchronous control over the process of displaying the transparent area and the playing window. Therefore, the present application can avoid the white-edged interfaces and data jitter that arise during interface scrolling in conventional techniques.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
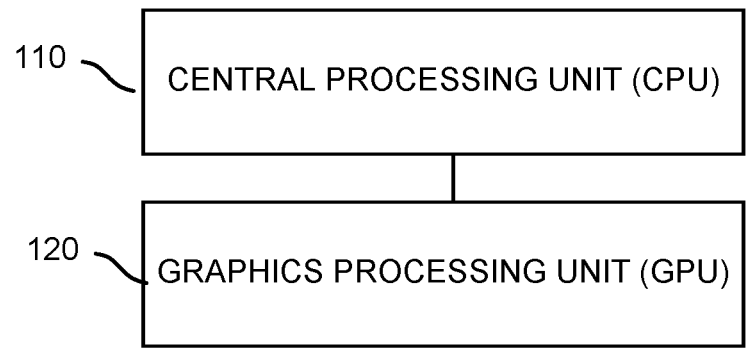
FIG. 1 is a hardware block diagram of an embodiment of a device for playing multimedia data.

FIG. 1 is a hardware block diagram of an embodiment of a device for playing multimedia data. In some embodiments, the device 100 is configured to perform the process 200 of FIG. 2 and comprises: a central processing unit (CPU) 110 and a graphics processing unit (GPU) 120.

In some embodiments, the device 100 has the CPU 110 and the GPU 120 as hardware and an operating system and applications (e.g., multimedia data playing client, browser, and mobile terminal desktop applications) internal to or in the upper layer of the operating system as software. The operating system can provide multiple services, such as, for example, a multimedia data playing service such as an audio player, a video player, a game player, etc.

The device 100 can be a handheld device, a vehicle onboard device, a wearable device, a television device, or a computer device that has a wireless communication function, or the device 100 could be another processing device that is connected to a modem (for example, device 100 can be a mobile phone).

The GPU 120 can provide interface element rendering functions. The GPU can be a programmable logic chip (processor) specialized for display functions. Through rendering, the GPU 120 can implement a layout of interface elements on an interface. For example, interface effects are exhibited when a browser is running, the desktop effects are exhibited when the operating system is running, and the display area effects exhibited by an application client on the operating system desktop are the results of the GPU rendering data that is for display. The CPU 110 and the GPU 120 are connected on the hardware layer. The operating system runs on the CPU 110, and the application issues the data that is to be rendered by the GPU via an interface provided by the operating system. The GPU renders the data that is to be rendered and stores the rendering results. For example, the GPU stores the data in the display memory (random-access memory (RAM), and/or video random-access memory (VRAM)) of the GPU 120.

The GPU 120 can be called by a rendering engine to implement a GPU rendering function. In one example, the rendering engine is a module provided by the application itself. In another example, the rendering engine is a module provided by the operating system or a third party as a plug-in or in some other form. The rendering engine can generate a drawing layer in the VRAM during rendering. The drawing layer is a medium for drawing. The interface elements are drawn in the drawing layer. The drawing layer's drawing results are acquired and exhibited through a display function-providing display application in the operating system.

The following is a process for playing multimedia data on an interface: a transparent area is set up in a drawing layer when rendering interface elements of an interface. A multimedia data playing window can be set up in another drawing layer via a multimedia data playing service. The multimedia data playing window is an interface that can display multimedia data. As an example, the playing window overlaps the transparent area. In some embodiments, "overlapping" means total overlap or partial overlap.

The process for playing multimedia data can reduce or eliminate white-edged interfaces or data jitter that arises during interface scrolling.

Figure 2:
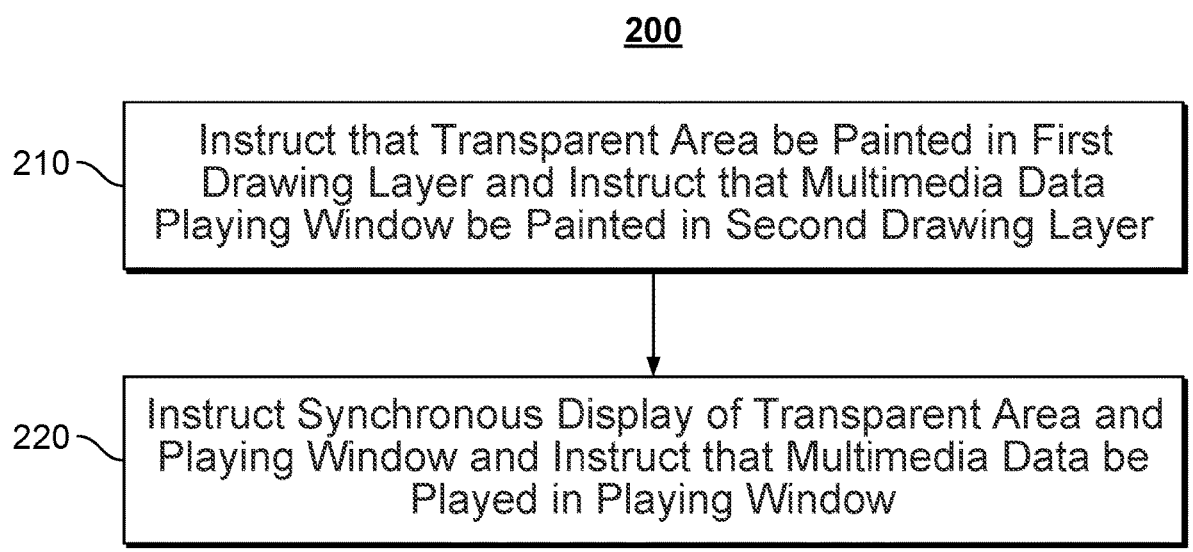
FIG. 2 is a flowchart of an embodiment of a process for playing multimedia data.

FIG. 2 is a flowchart of an embodiment of a process for playing multimedia data. In some embodiments, the process 200 is performed by the device 100 of FIG. 1 and comprises:

In 210, the device instructs that a transparent area be painted in a first drawing layer and instructs that a multimedia data playing window be painted in a second drawing layer. The first drawing layer and the second drawing layer correspond to different drawing layers. They can be drawn simultaneously. They can be drawn one after another. In other words, the order of the drawing of the first drawing layer and the second drawing layer does not matter. The multimedia data playing window overlaps with the transparent area. In the present application, "advising" can be understood as instructing (or controlling) an advised entity to execute or perform a certain action by sending the entity an instruction. The advice can be included in a computer-executed instruction. For example, an instruction can be sent through a GPU process to instruct the recipient of the instruction to draw a transparent area in a first drawing layer. In another example, an instruction can be sent to instruct the recipient of the instruction to draw a multimedia data playing window in a second drawing layer, etc. The instruction can be sent via an inter-process communication (IPC) call by sharing memory or passing messages.

In 220, the device instructs synchronous display of the transparent area and the playing window, and instructs that the multimedia data be played in the playing window. The order of the drawing of the transparent area and the playing window does not matter as long as the transparent area and the playing window are displaying at the same time.

As an example, operation 220 can be performed after operation 210 is completed, and the executing entities for operation 210 and operation 220 can be the same or different. For example, operation 210 and operation 220 are both executed by the GPU process. As an example, the GPU process is a process activated in the operating system when the GPU is called. In another example, operation 210 could be performed by another entity such as the CPU while operation 220 is performed by the GPU. In the event that operation 210 and operation 220 are performed by the same executing entity such as the GPU process, the performing of operations 210 and 220 by the same executing entity helps control the synchronous display process of the transparent area and the playing window.

The process 200 avoids white-edged interfaces and data jitter by performing operation 220 to control synchronous display of the transparent area and the playing window by a display service. In other words, as long as the transparent area and the playing window are displayed at the same time, white-edged interfaces and data jitter can be avoided.

In operation 210, the times at which the advice to draw a transparent area and the advice to draw a playing window are sent can be after the first and second information are acquired. In the present application, the first information is used to instruct that the transparent area be drawn, and the second information is used to instruct that the playing window be drawn. As an example, the first information and the second information include information such as coordinates or dimensions of the transparent area and the displaying window, respectively. As another example, the first information and the second information include information from which the transparent area and the displaying window coordinates or dimensions can be calculated respectively.

In the following example, a GPU process performs the operations shown in FIG. 2. The first information and second information can be acquired by having the GPU process receive the first information and the second information from another entity. In another example, the GPU process receives the first information from another entity and then obtains the second information based on the first information.

The times at which the rendering process or thread sends the first information or the second information could be during an initial rendering of interface elements or when a new layout of the interface elements is implemented. For example, the user sends a trigger instruction such as starting to play a piece of media, and the interface downloads new service data from the server. For a process whereby another entity sends the first information and the second information to a GPU process, the descriptions in the relevant sections of this document can be referred to.

The message whereby the GPU process instructs that a transparent area and a playing window be drawn can include the first information and the second information. The message can also instruct the message-receiving entity to acquire the first information and the second information through another channel. For example, the GPU process instructs a rendering engine to send the first information and the second information to the module for drawing the transparent area and the module for drawing the playing window, respectively. In another example, the GPU could instruct the module for drawing the transparent area and the module for drawing the playing window to request the first information and the second information, respectively, from the rendering engine.

There are multiple ways in which the GPU process instructs the transparent area and the playing window to be drawn. For example, the GPU process can separately start two parallel threads: one thread for instructing the position for drawing the transparent area and another thread for instructing the position for drawing the playing window. In another example, a GPU process can start a thread to serially send instructions to draw a transparent area and a playing window. The GPU process could first instruct that the transparent area be drawn and then instruct that the playing window be drawn. In yet another example, the GPU process could first instruct that the playing window be drawn and then instruct that the transparent area be drawn. In some embodiments, the GPU process issues a command through an extension interface to a multimedia playing service to set the playing window position. For example, the multimedia playing service could be instructed through the following command to draw a playing window in a drawing layer, where SurfaceX indicates the drawing layer where the playing window is to be located:

GL_APICALL void GL_APIENTRY glSetSurfaceX (GLint xoffset, GLint yoffset, GLint width, GLint height)

The above command also provides an example of how the location and the size of the playing window are set.

In operation 220, the GPU process can instruct a display service of the operating system to display an application interface with a new layout and a multimedia data playing window. Non-synchronous display of the transparent area and the playing window is eliminated because the GPU process instructs the display service of both the application interface and the multimedia data playing window. White edges and jitter are thereby avoided. The GPU process can also instruct the display service to acquire the next frame of to-be-displayed multimedia data.

Figure 3A:
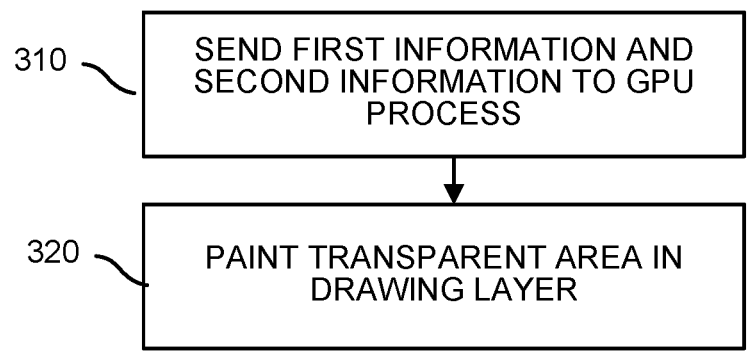
FIG. 3A is a flowchart of an embodiment of a process for rendering an interface.

Regarding the multimedia playing service painting a playing window, one may refer to any conventional implementation of painting (displaying) a playing window, and a description of painting a playing window will not be disclosed for conciseness. FIG. 3A is a flowchart of an embodiment of a process for rendering an interface. In some embodiments, the process 300 is an implementation of operation 220 of FIG. 2 and comprises:

In 310, the device sends first information and second information to a GPU process. The first information and the second information are described above and will not be repeated for conciseness.

In 320, upon receiving an advice from the GPU process, the device paints the transparent area in a drawing layer based on the first information.

The process 300 shown by FIG. 3A can be performed by a rendering engine. Conventionally, the rendering engine has relatively little control over the playback service, and the playback service manages the position and size of its own playback window (e.g., the multimedia data playing window). The drawing layer of the rendering engine and the drawing layer of the multimedia data playing window are not well coordinated, which leads to a white edge phenomenon. Unlike conventional processes for rendering an interface, an object to which the rendering engine sends the second information is a GPU process and not a multimedia data playing service. Furthermore, the GPU process also manages the drawing layer of the multimedia data playing window. The multimedia data playing service is only responsible for rendering the content, not responsible for the location, etc. The GPU process manages both the drawing layer of the multimedia data playing window and the drawing layer of the rendering engine to allow for the coordination of the two drawing layers. Accordingly, the white edge phenomenon does not occur. A GPU can be used as a substitute for the executing entity of operation 220.

The channel through which the first information is obtained can be based on preset parameters, service data issued by a server, a user trigger instruction, etc. For example, during initial rendering of interface elements, the first information is obtained based on the preset parameters. The interface elements relate to content displayed in the interface, and are not limited to the interface in the multimedia data playing window. In another example, the first information is obtained after a render tree is generated from the service data issued by a server. The render tree can be generated based on a Document Object Model (DOM) tree. In yet another example, the first information is obtained based on the user trigger instruction. After the user swipes their finger along the touchscreen, the rendering tree receives the position change information, and then the first information is obtained. The channel for obtaining the first information can be the same channel as for obtaining the second information. In some embodiments, the first information can be obtained first, and the second information is then calculated based on the first information.

The process whereby the first information and the second information are generated based on a user trigger instruction is described as follows:

The user issues a trigger instruction to an interface. The trigger instruction causes a change in the displacement of the interface elements. After the interface receives the trigger instruction, the interface can instruct the rendering engine to re-render the displacement of the interface elements. The trigger instruction can be a key message or a touch message. The key message can relate to user tapping a key on the keyboard. The touch message can relate to a user touching a touchscreen. The trigger instruction can include "up," "down," "left," "right," motion distance, etc. One way in which the interface can instruct the rendering engine is by acquiring from the trigger instruction information relating to interface element position changes (e.g., parameters representing direction, offset parameters, or both) and sending the interface element position changes to the rendering engine. The rendering engine can calculate new position information for the interface elements based on interface element position change information. The new position information includes the first information and the second information.

The first information and the second information can be sent together with position information that sets other interface elements. All the information that is to be sent can be sent via one message or via different messages. The particulars of the sending of the information can be determined based on design needs. The present application imposes no restrictions on the sending of the information. As an example, a rendering thread can be instructed of the first information and the second information via an extension interface. The rendering thread sends the first information and the second information separately via different commands to the GPU process to trigger the GPU process to execute operation 220-stage actions.

In some embodiments, interface scrolling takes place while multimedia data is playing. The user can perform a certain operation on the application interface to cause the interface elements to shift (e.g., the user triggers scrolling (which continuously refreshes the page content in a selected direction), page up (which displays one previous page at a time), page down (which displays one subsequent page at a time), etc.). When the interface elements of an interface where a transparent area is located undergo a shift, a new interface layout is to be implemented. The position of the transparent area and the position of the multimedia data playing window can be adjusted accordingly. The "interfaces" referred to can be limited to application interfaces and operating system desktops. The multimedia data can be video data, 3D animation, game data, etc.

Figure 3B:
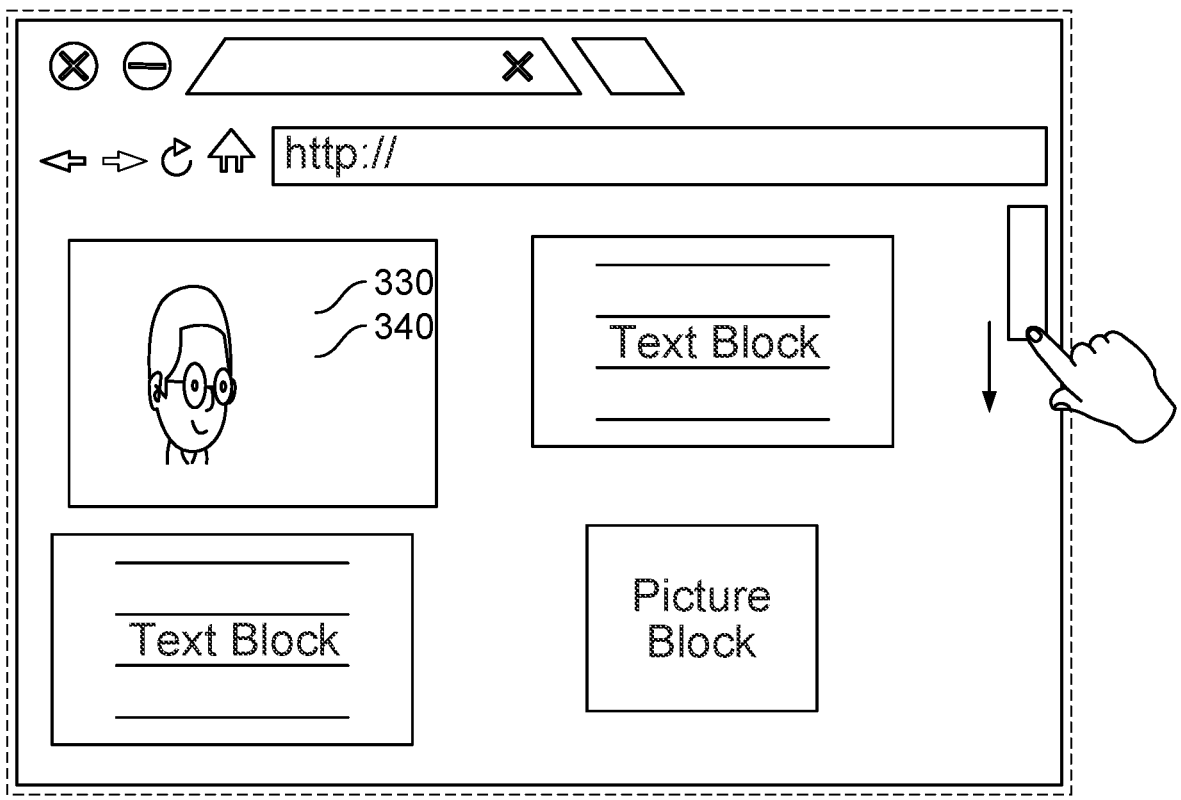
FIG. 3B is an illustration of a first example of interface scrolling triggered by a user instruction.
Figure 3C:
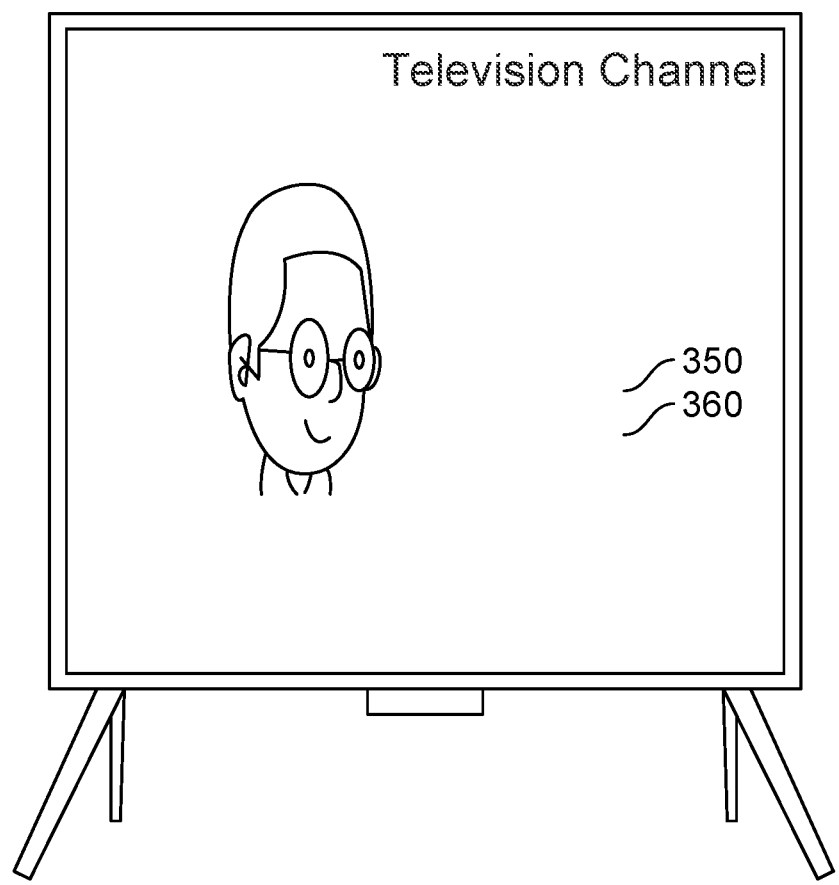
FIG. 3C is an illustration of a second example of interface scrolling triggered by a user instruction.
Figure 3C:
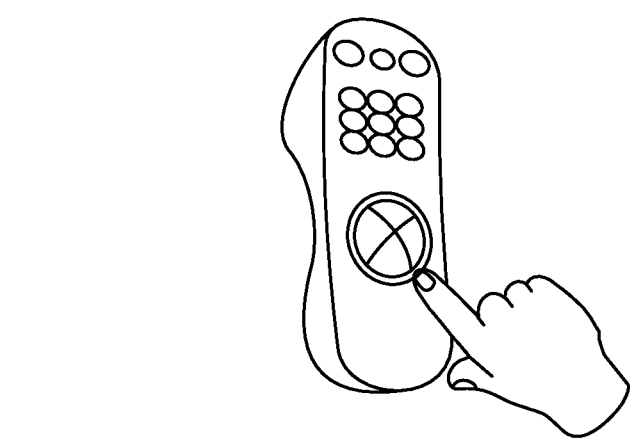
Figure 3D:
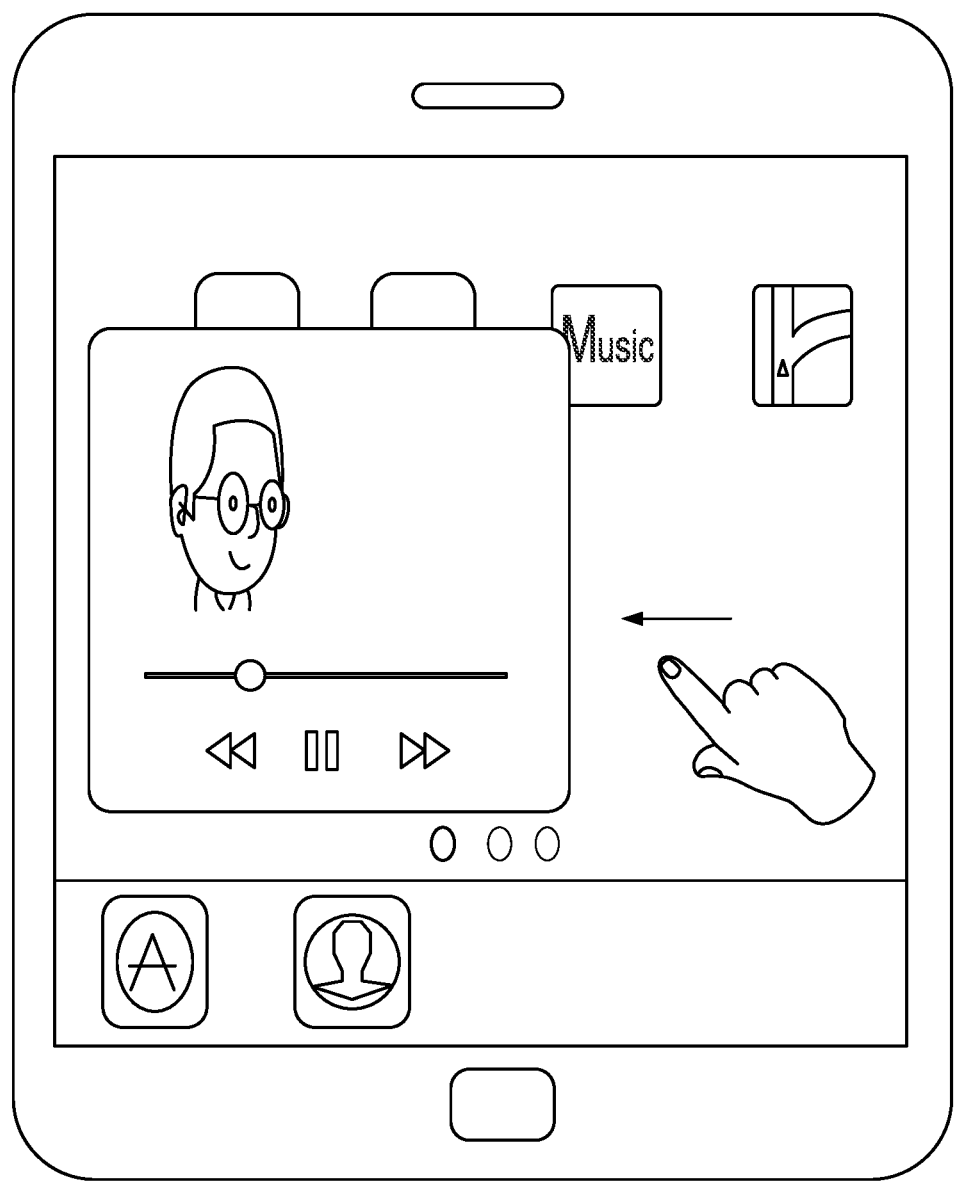
FIG. 3D is an illustration of a third example of interface scrolling triggered by a user instruction.

FIGS. 3B-3D illustrate examples of interface scrolling triggered by a user instruction. Please note that application scenarios applicable to the present application are not limited to the examples described below.

FIG. 3B is an illustration of a first example of interface scrolling triggered by a user instruction. The first example depicts a scenario of browser interface scrolling. A transparent area 340 on a browser interface is painted by the browser rendering engine while the browser interface elements are being painted. A multimedia data playing window 330 is painted by a multimedia data playing service in another drawing layer. Because the transparent area and the playing window overlap, what the user sees are presentation effects of the playing window. Other areas in the browser interface display other interface elements (e.g., text blocks within a picture, picture blocks, etc.). The user issues a trigger instruction through a scroll bar on the interface. After receiving the trigger instruction, the browser instructs the browser rendering engine to implement a new interface layout.

FIG. 3C is an illustration of a second example of interface scrolling triggered by a user instruction. When an Internet Protocol television (IPTV) operating system interface is being rendered, a transparent area 350 is painted by an operating system rendering engine, and a multimedia data playing window 360 is painted by the multimedia data playing service. The playing window and the transparent area cover the entire interface area. The user issues a trigger instruction such as up, down, or turn page via a remote control. After the IPTV interface receives the trigger instruction, the IPTV interface instructs the operating system rendering engine to implement a new interface layout.

FIG. 3D is an illustration of a third example of interface scrolling triggered by a user instruction. In FIG. 3D, a game app has been deployed on a tablet desktop. A playing window of the game application overlaps with a transparent area on the desktop. The user issues a trigger instruction using a left-right swipe of the finger on the screen to cause positions of the desktop elements to change. In response to the user's trigger instruction, the tablet desktop instructs the rendering engine of the operating system to implement a new interface layout.

Other scenario descriptions for other devices capable of playing multimedia exist; however, additional scenario descriptions for other devices capable of playing multimedia will not be described for conciseness.

Figure 4:
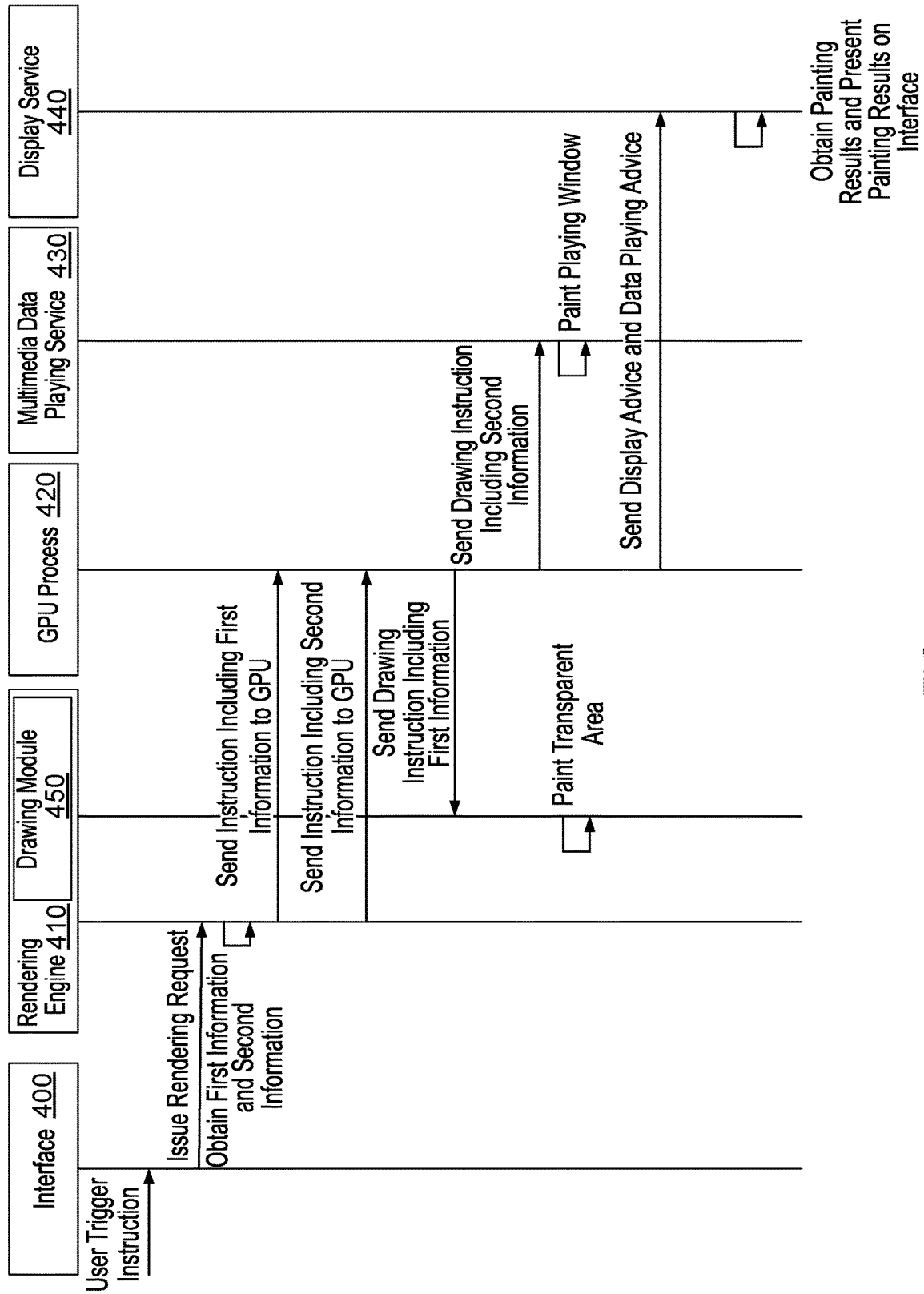
FIG. 4 is a time sequence diagram of an example of interface scrolling triggered by a user instruction.

FIG. 4 is a time sequence diagram of an example of interface scrolling triggered by a user instruction. The communication entity includes a rendering engine 410 configured to render an application interface 400, a GPU process 420, a multimedia data playing service 430, a display service 440, and a drawing module 450. In some embodiments, the drawing module 450 is configured to implement a drawing function within the rendering engine 410.

The user issues a trigger instruction to the interface 400. The trigger instruction includes a motion direction and offset information for the interface elements.

Responding to the trigger instruction, the interface 400 generates a rendering request and issues the rendering request to the rendering engine 410. The rendering request includes a motion direction and offset information for the interface elements.

The rendering engine 410 calculates and obtains new position information for the interface elements. The new position information includes first information, and the obtaining of the second information is based on the first information. In addition, the first information and the second information are sent separately by a rendering thread via two instructions to the GPU process 420. The first information and the second information are described above, and will not be further described for conciseness.

The GPU process 420 inserts the new position information (including the first information) for the interface elements in a drawing advice (e.g., a drawing instruction) and sends the drawing instruction to the drawing module 450. The GPU process 420 inserts the second information in another drawing advice and sends the other drawing instruction to the multimedia data playing service 430.

When the drawing module 450 paints the interface elements, the drawing module 450 paints the new position of the transparent area based on the first information. The multimedia playing service 430 instructs the painting module corresponding to the multimedia playing service 430 to paint the playing window.

The GPU process 420 sends an instruction to the display service 440 to synchronously display the transparent window and the multimedia data playing window. The display service 440 obtains the painting results and presents the painting results on the interface. The display service 440 also displays the next frame of to-be-displayed multimedia playing data in the playing window.

Figure 5:
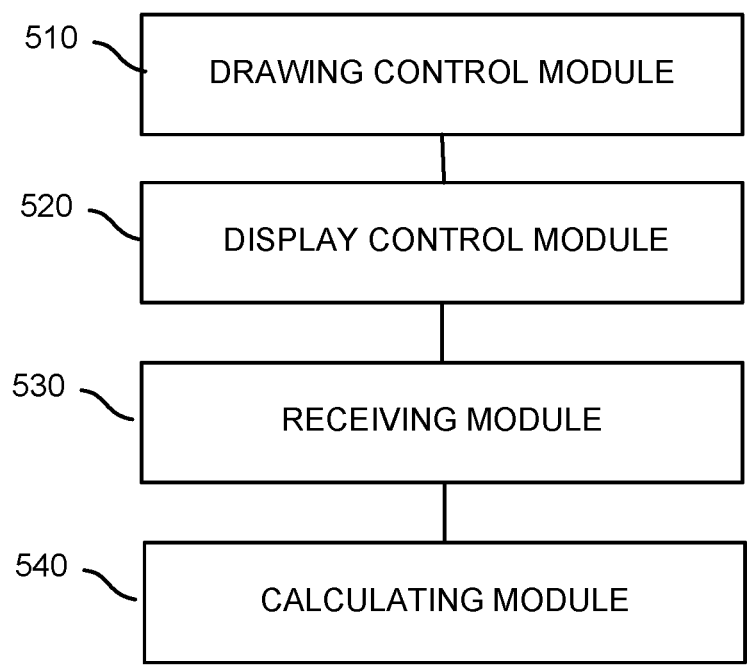
FIG. 5 is a software logic block diagram of an embodiment of a device for playing multimedia data.

FIG. 5 is a software logic block diagram of an embodiment of a device for playing multimedia data. In some embodiments, the device 500 is configured to implement the process 200 of FIG. 2 and includes: a drawing control module 510, a display control module 520, a receiving module 530, and a calculating module 540.

In some embodiments, the drawing control module 510 is configured to instruct that a transparent area be painted in a first drawing layer, and instruct that a multimedia data playing window be painted in a second drawing layer, the multimedia data playing window overlapping with the transparent area.

In some embodiments, the display control module 520 is configured to instruct synchronous display of the transparent area and the playing window, and instruct that the multimedia data be played in the playing window.

The device 500 can be located in the graphics processing unit (GPU) process.

In some embodiments, the receiving module 530 is configured to receive the first information and the second information, and instruct the drawing control module 510 of the first information and the second information. In some embodiments, the first information instructs that the transparent area be painted and the second information instructs that the playing window be painted. The receiving module 530 is configured to receive the first information and the second information from a rendering thread when interface elements are first rendered or when a user issues a trigger instruction. In some embodiments, the trigger instruction includes a user scroll instruction, a page up instruction, a page down instruction, etc.

In some embodiments, the receiving module 530 is configured to receive first information, the first information instructing that the transparent area be painted; and In some embodiments, the calculating module 540 is configured to obtain the second information based on the first information, the second information instructing that the playing window be painted.

In some embodiments, the drawing control module 510 is configured to instruct that the multimedia data playing window be painted in a second drawing layer.

In some embodiments, the drawing control module 510 is configured to instruct a multimedia data playing service, the multimedia data playing service painting a multimedia data playing window in the second drawing layer based on the second information. In some embodiments, the second information instructs the playing window to be painted.

The multimedia data can include video data, 3D animation data, game data, etc.

Figure 6:
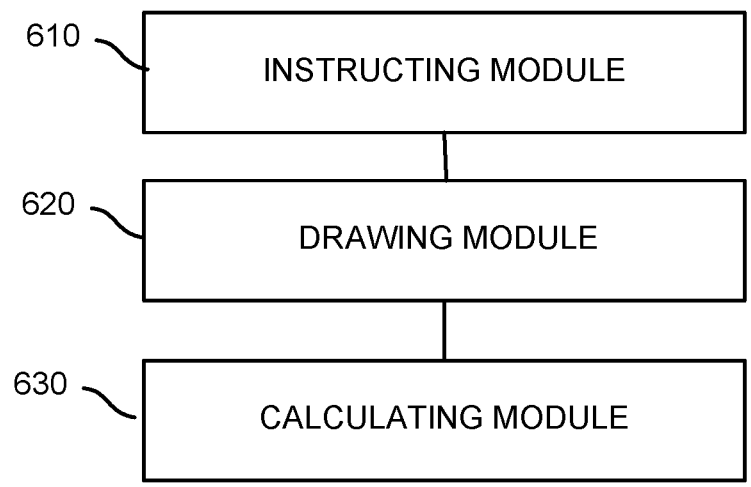
FIG. 6 is a software logic block diagram of an embodiment of a device for rendering an interface.

FIG. 6 is a software logic block diagram of an embodiment of a device for rendering an interface. In some embodiments, the device 600 is configured to implement the process 300 of FIG. 3A and includes: an instructing module 610, a drawing module 620, and a calculating module 630.

In some embodiments, the instructing module 610 is configured to issue first information and second information to a graphics processing unit (GPU) process. In some embodiments, the first information instructs that a transparent area be painted and the second information instructs that a multimedia data playing window be painted.

In some embodiments, the drawing module 620 is configured to paint the transparent area in a drawing layer based on the first information upon receiving advice from the GPU process.

In some embodiments, the calculating module 630 is configured to obtain the first information based on preset parameters or a user trigger instruction when interface elements are first rendered. The user trigger instruction includes a scroll instruction, a page up instruction, a page down instruction, etc.

The calculating module can also be configured to obtain the second information based on the first information.

The instructing module 610 can be further configured to: instruct a rendering thread of the first information and the second information via an extension interface. In some embodiments, the rendering thread instructs the GPU process of the first information and the second information.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 7:
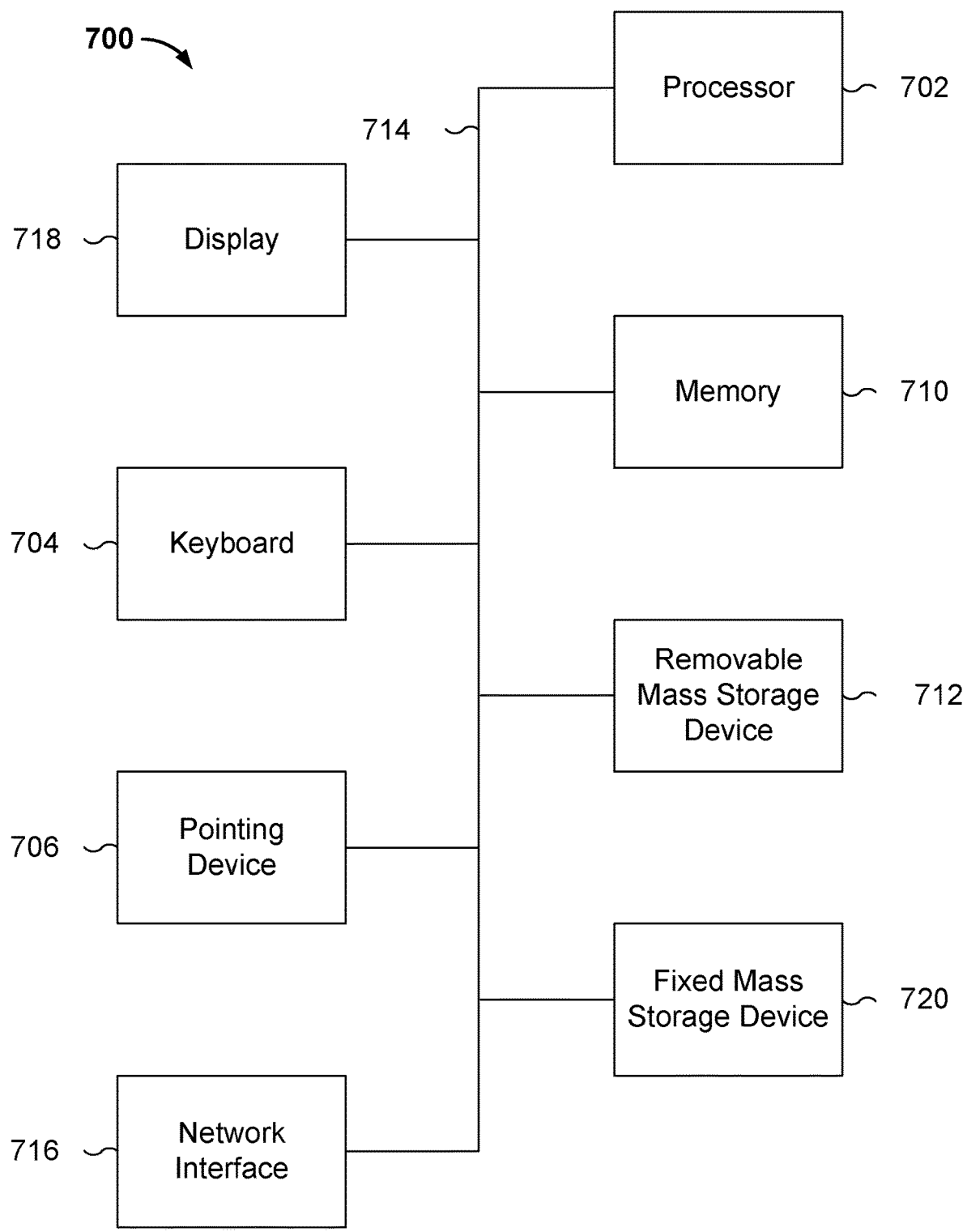
FIG. 7 is a functional diagram illustrating a programmed computer system for playing multimedia data in accordance with some embodiments.

FIG. 7 is a functional diagram illustrating a programmed computer system for playing multimedia data in accordance with some embodiments. As will be apparent, other computer system architectures and configurations can be used to play multimedia data. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718).

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storages 712, 720 generally store additional programming instructions, data, and the like that typically are not in active use by the processor 702. It will be appreciated that the information retained within mass storages 712 and 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   instructing, using a processor, that a transparent area be painted in a first drawing layer based on first information, wherein the first information includes coordinates or dimensions of the transparent area;
   instructing, using the processor, that a multimedia data playing window be painted in a second drawing layer, the multimedia data playing window overlapping with the transparent area, wherein the instructing that the multimedia data playing window be painted in the second drawing layer comprises:
      determining coordinates or dimensions of the multimedia data playing window associated with second information, the coordinates or the dimensions of the multimedia data playing window being determined based on the coordinates or the dimensions of the transparent area associated with the first information; and
      instructing a multimedia data playing service to paint the multimedia data playing window in the second drawing layer based on the second information, wherein the second information includes the coordinates or the dimensions of the multimedia data playing window;
   instructing, using the processor, synchronous display of the transparent area and the multimedia data playing window;
   instructing, using the processor, that multimedia data be played in the multimedia data playing window; and
   receiving new first information and new second information from a rendering thread in response to a trigger instruction, the new first information being different from the first information, the new second information being different from the second information, the new first information being used to instruct the transparent area to be painted, the new second information being used to instruct the multimedia data playing window to be painted, wherein the trigger instruction comprises at least one of: a user scroll instruction, a page up instruction, or a page down instruction.

2. The method as described in claim 1, wherein the processor is a graphics processing unit (GPU).

3. The method as described in claim 1, wherein the multimedia data comprises video data, 3D animation data, game data, or any combination thereof.

4. The method as described in claim 1, wherein the multimedia data playing service corresponds to an audio player, a video player, a game player, or any combination thereof.

5. The method as described in claim 1, wherein the instructing of the synchronous display of the transparent area and the multimedia data playing window comprises:
displaying the transparent area and the multimedia data playing window at the same time.

6. A method, comprising:
determining coordinates or dimensions of a multimedia data playing window associated with second information, the coordinates or the dimensions of the multimedia data playing window being determined based on coordinates or dimensions of a transparent area associated with first information;
issuing, using a processor, the first information and the second information to a graphics processing unit (GPU) process, the first information instructing that the transparent area is to be painted and the second information instructing that the multimedia data playing window is to be painted, wherein the first information includes the coordinates or the dimensions of the transparent area, wherein the second information includes the coordinates or the dimensions of the multimedia data playing window, and wherein the issuing of the first information and the second information to the GPU process comprises:
instructing a multimedia data playing service to paint the multimedia data playing window based on the second information;
receiving advice from the GPU process;
in response to receiving the advice, painting, using the processor, the transparent area in a drawing layer based on the first information; and
obtaining new first information based on a user trigger instruction, the new first information being different from the first information, new second information being obtained from the new first information, the new second information being different from the second information, the new first information being used to instruct the transparent area to be painted, the new second information being used to instruct the multimedia data playing window to be painted, wherein the user trigger instruction comprises at least one of: a user scroll instruction, a page up instruction, or a page down instruction.

7. The method as described in claim 6, wherein the issuing of the first information and the second information to the GPU process comprises:
instructing a rendering thread of the first information and the second information via an extension interface, the rendering thread instructing the GPU process of the first information and the second information.

8. A system, comprising:
a processor; and
a memory coupled with the processor, wherein the memory is configured to provide the processor with instructions which when executed cause the processor to:
instruct that a transparent area be painted in a first drawing layer based on first information, wherein the first information includes coordinates or dimensions of the transparent area;
instruct that a multimedia data playing window be painted in a second drawing layer, the multimedia data playing window overlapping with the transparent area, wherein the instructing that the multimedia data playing window be painted in the second drawing layer comprises to:
determine coordinates or dimensions of the multimedia data playing window associated with second information, the coordinates or the dimensions of the multimedia data playing window being determined based on the coordinates or the dimensions of the transparent area associated with the first information; and
instruct a multimedia data playing service to paint the multimedia data playing window in the second drawing layer based on the second information, wherein the second information includes the coordinates or the dimensions of the multimedia data playing window;
instruct synchronous display of the transparent area and the multimedia data playing window;
instruct that multimedia data be played in the multimedia data playing window; and
receive new first information and new second information from a rendering thread in response to a trigger instruction, the new first information being different from the first information, the new second information being different from the second information, the new first information being used to instruct the transparent area to be painted, the new second information being used to instruct the multimedia data playing window to be painted, wherein the trigger instruction comprises at least one of: a user scroll instruction, a page up instruction, or a page down instruction.

9. The system as described in claim 8, wherein the processor is a graphics processing unit (GPU).

10. The system as described in claim 8, wherein the multimedia data comprises video data, 3D animation data, game data, or any combination thereof.

11. A computer program product being embodied in a tangible non-transitory computer readable storage medium and comprising computer instructions for:
instructing that a transparent area be painted in a first drawing layer based on first information, wherein the first information includes coordinates or dimensions of the transparent area;
instructing that a multimedia data playing window be painted in a second drawing layer, the multimedia data playing window overlapping with the transparent area, wherein the instructing that the multimedia data playing window be painted in the second drawing layer comprises:
determining coordinates or dimensions of the multimedia data playing window associated with second information, the coordinates or the dimensions of the multimedia data playing window being determined based on the coordinates or the dimensions of the transparent area associated with the first information; and
instructing a multimedia data playing service to paint the multimedia data playing window in the second drawing layer based on the second information, wherein the second information includes the coordinates or the dimensions of the multimedia data playing window;
instructing synchronous display of the transparent area and the multimedia data playing window;
instructing that multimedia data be played in the multimedia data playing window; and receiving new first information and new second information from a rendering thread in response to a trigger instruction, the new first information being different from the first information, the new second information being different from the second information, the new first information being used to instruct the transparent area to be painted, the new second information being used to instruct the multimedia data playing window to be painted, wherein the trigger instruction comprises at least one of: a user scroll instruction, a page up instruction, or a page down instruction.

\* \* \* \* \*